United States Patent
Cai et al.

(10) Patent No.: US 10,399,021 B2
(45) Date of Patent: Sep. 3, 2019

(54) WATER PURIFICATION SYSTEM

(71) Applicants: GUANGDONG MIDEA WATER DISPENSER MFG. CO., LTD., Foshan (CN); MIDEA GROUP CO., LTD., Foshan (CN)

(72) Inventors: Xuegang Cai, Foshan (CN); Xingzhi Zhang, Foshan (CN)

(*) Notice: Subject to any disclaimer, the term of this patent is extended or adjusted under 35 U.S.C. 154(b) by 263 days.

(21) Appl. No.: 14/771,523

(22) PCT Filed: Apr. 30, 2015

(86) PCT No.: PCT/CN2015/078069
§ 371 (c)(1),
(2) Date: Aug. 31, 2015

(87) PCT Pub. No.: WO2016/095399
PCT Pub. Date: Jun. 23, 2016

(65) Prior Publication Data
US 2016/0361673 A1    Dec. 15, 2016

(30) Foreign Application Priority Data

Dec. 19, 2014   (CN) .......................... 2014 1 0811804
Dec. 19, 2014   (CN) ..................... 2014 2 0821344 U (51) Int. Cl.
*B01D 61/04*   (2006.01)
*B01D 61/58*   (2006.01)
(Continued)

(52) U.S. Cl.
CPC ............. *B01D 36/02* (2013.01); *B01D 29/56* (2013.01); *B01D 61/04* (2013.01); *B01D 61/16* (2013.01);
(Continued)

(58) Field of Classification Search
CPC .... B01D 61/025; B01D 61/027; B01D 61/04; B01D 61/58; B01D 2311/2649;
(Continued)

(56) References Cited

U.S. PATENT DOCUMENTS 6,558,537 B1    5/2003  Herrington et al.
2011/0049049 A1* 3/2011  Benner ................. B01D 61/04
                                            210/636

FOREIGN PATENT DOCUMENTS

CN         102910752         2/2013
CN         102910752 B    *  11/2013
(Continued)

OTHER PUBLICATIONS

CN 103755051—EPO Machine Translation, 5 pages. (Year: 2017).*
(Continued)

*Primary Examiner* — Patrick J Orme
(74) *Attorney, Agent, or Firm* — Kilpatrick Townsend & Stockton (57) ABSTRACT

A water purification system (1) includes a composite filter cartridge (100) that includes a pretreatment filter cartridge (110) and a filtration membrane assembly (120), and is provided with a raw water inlet (130), a pretreatment water outlet (140), a pressurizing pretreatment water inlet (150), a pure water outlet (160) and a condensed water outlet (170); a raw water inlet pipe (200) connected with the raw water inlet (130); a pure water outlet pipe (300) connected with the pure water outlet (160); a condensed water outlet pipe (400) connected with the condensed water outlet (170); a pretreatment water outlet pipe (500) connected with the pretreatment water outlet (140); a pressurizing pretreatment water inlet pipe (600) connected with the pressurizing pretreatment water inlet (150) and the pretreatment water outlet pipe
(Continued)

(500) respectively; and a booster pump (900) disposed on the pretreatment water outlet pipe (500).

12 Claims, 4 Drawing Sheets

(51) Int. Cl.

| | |
|---|---|
| *B01D 36/02* | (2006.01) |
| *B01D 29/56* | (2006.01) |
| *B01D 61/16* | (2006.01) |
| *B01D 63/10* | (2006.01) |
| *C02F 1/44* | (2006.01) |
| C02F 1/28 | (2006.01) |
| C02F 1/50 | (2006.01) |
| C02F 1/00 | (2006.01) |
| B01D 61/02 | (2006.01) |
| B01D 61/14 | (2006.01) |
| B01D 71/26 | (2006.01) |

(52) U.S. Cl.
CPC ............ *B01D 61/58* (2013.01); *B01D 63/10* (2013.01); *C02F 1/44* (2013.01); *B01D 61/025* (2013.01); *B01D 61/027* (2013.01); *B01D 61/145* (2013.01); *B01D 71/26* (2013.01); *B01D 2311/2626* (2013.01); *B01D 2311/2649* (2013.01); *B01D 2313/50* (2013.01); *B01D 2319/02* (2013.01); *B01D 2319/06* (2013.01); *C02F 1/001* (2013.01); *C02F 1/283* (2013.01); *C02F 1/441* (2013.01); *C02F 1/442* (2013.01); *C02F 1/444* (2013.01); *C02F 1/50* (2013.01); *C02F 2209/005* (2013.01); *C02F 2209/40* (2013.01)

(58) Field of Classification Search
CPC ............ B01D 2313/50; B01D 2319/02; B01D 2319/06; C02F 1/441; C02F 1/444; C02F 1/50; C02F 2209/40
See application file for complete search history.

(56) References Cited

FOREIGN PATENT DOCUMENTS

| | | | |
|---|---|---|---|
| CN | 103755051 | | 4/2014 |
| CN | 103755051 | A * | 4/2014 |
| CN | 103755051 | A | 4/2014 |
| CN | 203683248 | U | 7/2014 |
| CN | 203728657 | U * | 7/2014 |
| CN | 203728657 | U | 7/2014 |
| CN | 203728660 | | 7/2014 |
| CN | 203728660 | U | 7/2014 |
| CN | 203904090 | U | 10/2014 |
| CN | 203904091 | | 10/2014 |
| CN | 104176841 | A | 12/2014 |
| CN | 104556450 | | 4/2015 |
| CN | 204310890 | U | 5/2015 |
| JP | 2014188465 | | 10/2014 |

OTHER PUBLICATIONS

CN 203728657—EPO Machine Translation, 13 pages. (Year: 2017).*
CN102910752A—EPO Machine Translation, 38 pages. (Year: 2017).*
European Patent Office, Extended European Search Report for EP15868913.3, dated Aug. 28, 2017.
The State Intellectual Property Office of Peoples Republic of China, First Office Action for CN201410811804.X, dated Jan. 21, 2016.
The State Intellectual Property Office of Peoples Republic of China, Second Office Action for CN201410811804.X, dated Aug. 16, 2016.
Ruan Meijuan et al., Beverage Technology, China Light Industry Press, Jan. 2013.
Xu Tongwen, Membrane Chemistry and Technology Tutorials, Press of University of Science and Technology of China, Dec. 2013.

* cited by examiner

WATER PURIFICATION SYSTEM

FIELD

The present invention relates to a technical field of manufacturing electric appliances, and more particularly, to a water purification system.

BACKGROUND

The water purification system in the related art employs PP (polypropylene) cotton for a pre-filter cartridge and a series RO (reverse osmosis) filter cartridge, and purifies water via a multistage filter cartridge. The whole water purification system has disadvantages of complex pipeline connection, inconvenient installation and replacement, many joints and leakage risk points. Moreover, the service life of each filter cartridges in the multistage filter cartridge is not consistent, such that the user may have to change three to five filters. Frequent purchasing and replacement by professionals will degrade user experience and increase the cost of use.

SUMMARY

The present invention aims to solve at least one of the problems existing in the related art to at least some extent. Thus, the present invention provide a water purification system that has advantages of simple pipeline connection, convenient installation and replacement, few leakage risk points, good user experience and low cost of use.

In order to achieve the objective, the embodiments of the present invention provide a water purification system. The water purification system includes a composite filter cartridge that is provided with a raw water inlet, a pretreatment water outlet, a pressurizing pretreatment water inlet, a pure water outlet and a condensed water outlet, and includes a pretreatment filter cartridge located between the raw water inlet and the pretreatment water outlet, and a filtration membrane assembly embedded in the pretreatment filter cartridge and located between the pressurizing pretreatment water inlet and the pure water outlet and between the pressurizing pretreatment water inlet and the condensed water outlet; a raw water inlet pipe connected with the raw water inlet; a pure water outlet pipe connected with the pure water outlet; a condensed water outlet pipe connected with the condensed water outlet; a pretreatment water outlet pipe connected with the pretreatment water outlet; a pressurizing pretreatment water inlet pipe connected with the pressurizing pretreatment water inlet and the pretreatment water outlet pipe respectively; and a booster pump disposed on the pretreatment water outlet pipe.

The water purification system according to the embodiments of the present invention has advantages of simple pipeline connection, convenient installation and replacement, few leakage risk points, good user experience and low cost of use.

In addition, the water purification system according to the embodiments of the present invention has the following additional technical features.

According to an embodiment of the present invention, the water purification system further includes: a rinsing drain pipe having a first end connected with the condensed water outlet pipe, and a second end connected with the pretreatment water outlet pipe and the pressurizing pretreatment water inlet pipe respectively; a rinsing drain control valve disposed on the rinsing drain pipe; and a water inlet control valve disposed on the pressurizing pretreatment water inlet pipe.

According to an embodiment of the present invention, the water purification system further includes a wastewater proportion control valve disposed on the condensed water outlet pipe and located between the composite filter cartridge and the rinsing drain pipe.

According to an embodiment of the present invention, the water purification system further includes a flexible water bag disposed on the pure water outlet pipe and comprising a water volume detection device configured to detect the water volume in the flexible water bag; and a control device connected with the water volume detection device, the water inlet control valve, the booster pump, the rinsing drain control valve and the wastewater proportion control valve respectively.

According to an embodiment of the present invention, the water purification system further includes a water pump disposed on the pure water outlet pipe, the flexible water bag being located between the water pump and the composite filter cartridge.

According to an embodiment of the present invention, the flexible water bag is a composite of polyamide and polyethylene.

According to an embodiment of the present invention, an antibacterial agent is provided within the flexible water bag.

According to an embodiment of the present invention, the flexible water bag is connected with the pure water outlet pipe via a first three-way pipe.

According to an embodiment of the present invention, each of the water inlet control valve, the rinsing drain control valve and the wastewater proportion control valve is an electromagnetic valve.

According to an embodiment of the present invention, the pretreatment water outlet pipe, the pressurizing pretreatment water inlet pipe and the rinsing drain pipe are connected to each other via a second three-way pipe.

According to an embodiment of the present invention, the pretreatment filter cartridge comprises a PP non-woven fabric winding outer layer and an activated carbon inner layer; or the pretreatment filter cartridge comprises a PP outer layer, an activated carbon middle layer, and an ultrafiltration inner layer or a PP inner layer.

According to an embodiment of the present invention, the filtration membrane assembly comprises a central water collecting pipe, and a reverse osmosis membrane, an ultrafiltration membrane or a nanofiltration membrane winded around the central water collecting pipe.

REFERENCE NUMERALS

1 water purification system
100 composite filter cartridge 110 pretreatment filter cartridge
120 filtration membrane assembly
121 central water collecting pipe
122 filtration membrane
130 raw water inlet
140 pretreatment water outlet
150 pressurizing pretreatment water inlet
160 pure water outlet
170 condensed water outlet
200 raw water inlet pipe
300 pure water outlet pipe
400 condensed water outlet pipe
500 pretreatment water outlet pipe
600 pressurizing pretreatment water inlet pipe
700 rinsing drain pipe
800 flexible water bag
900 booster pump
1000 water inlet control valve
1100 rinsing drain control valve
1200 wastewater proportion control valve
1300 water pump
1400 first three-way pipe and second three-way pipe

DETAILED DESCRIPTION

Embodiments of the present invention will be described in detail and examples of the embodiments will be illustrated in the accompanying drawings, where same or similar reference numerals are used to indicate same or similar members or members with same or similar functions. The embodiments described herein with reference to the drawings are explanatory, which aim to illustrate the present invention, but shall not be construed to limit the present invention.

In the following, a water purification system 1 according to the embodiments of the present invention will be illustrated with reference to drawings.

As shown in FIG. 1 to FIG. 4, the water purification system 1 according to the embodiments of the present invention includes a composite filter cartridge 100, a raw water inlet pipe 200, a pure water outlet pipe 300, a condensed water outlet pipe 400, a pretreatment water outlet pipe 500, a pressurizing pretreatment water inlet pipe 600, a rinsing drain pipe 700, a flexible water bag 800, a booster pump 900, a water inlet control valve 1000, a rinsing drain control valve 1100, a wastewater proportion control valve 1200 and a control device (not shown).

The composite filter cartridge 100 includes a pretreatment filter cartridge 110 and a filtration membrane assembly 120 embedded in the pretreatment filter cartridge 110. The composite filter cartridge 100 is provided with a raw water inlet 130, a pretreatment water outlet 140, a pressurizing pretreatment water inlet 150, a pure water outlet 160 and a condensed water outlet 170. The raw water inlet pipe 200 is connected with the raw water inlet 130; the pure water outlet pipe 300 is connected with the pure water outlet 160; the condensed water outlet pipe 400 is connected with the condensed water outlet 170; the pretreatment water outlet pipe 500 is connected with the pretreatment water outlet 140; the pressurizing pretreatment water inlet pipe 600 is connected with the pressurizing pretreatment water inlet 150 and the pretreatment water outlet pipe 500 respectively. The rinsing drain pipe 700 has a first end connected with the condensed water outlet pipe 400, and a second end connected with the pretreatment water outlet pipe 500 and the pressurizing pretreatment water inlet pipe 600 respectively. The booster pump 900 is disposed on the pretreatment water outlet pipe 500. The water inlet control valve 1000 is disposed on the pressurizing pretreatment water inlet pipe 600. The rinsing drain control valve 1100 is disposed on the rinsing drain pipe 700. The wastewater proportion control valve 1200 is disposed on the condensed water outlet pipe 400 and located between the composite filter cartridge 100 and the rinsing drain pipe 700. The flexible water bag 800 is disposed on the pure water outlet pipe 300, and includes a water volume detection device (not shown) configured to detect the water volume in the flexible water bag 800. The control device is connected with the water volume detection device, the water inlet control valve 1000, the booster pump 900, the rinsing drain control valve 1100 and the wastewater proportion control valve 1200 respectively.

In the following, a working mechanism of the water purification system 1 according to the embodiments of the present invention will be illustrated.

Figure 2:
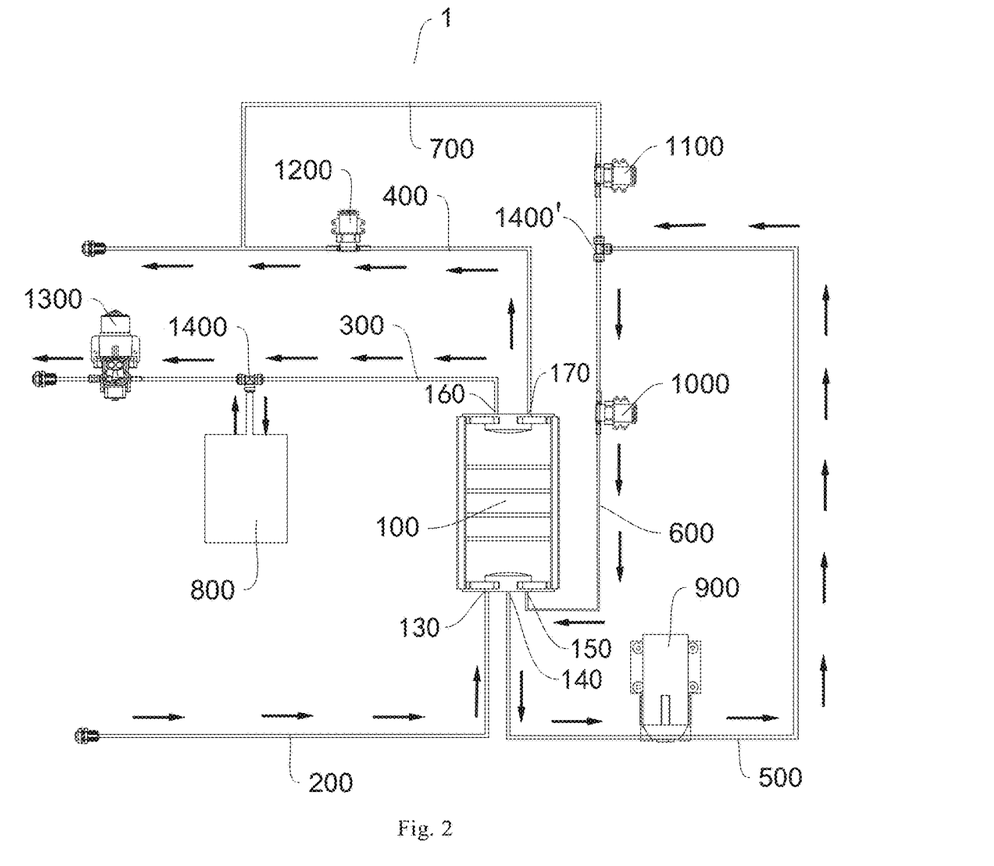
FIG. 2 is a schematic view of a water purification system in a state of normal water purification according to an embodiment of the present invention.

As shown in FIG. 2, in a state of normal water purification, the control device closes the rinsing drain control valve 1100 and opens the booster pump 900, the water inlet control valve 1000 and the wastewater proportion control valve 1200, when the water volume detection device detects that the pure water in the flexible water bag 800 runs out, such that raw water enters the composite filter cartridge 100 through the raw water inlet pipe 200 and the raw water inlet 130 for pretreatment, and is discharged via the pretreatment water outlet 140. Then, the water passes through the pretreatment water outlet pipe 500 and is pressurized by the booster pump 900, after it the water returns to the composite filter cartridge 100 through the pressurizing pretreatment water inlet pipe 600 and the pressurizing pretreatment water inlet 150. Pure water and condensed water produced after secondary purification by the filtration membrane assembly 120 flow out respectively via the pure water outlet 160 and the condensed water outlet 170. The pure water is transported via the pure water outlet pipe 300 and stored in the flexible water bag 800, such that the pure water in the flexible water bag 800 is accessible via the pure water outlet pipe 300 when in need. The control device closes the booster pump 900 and the water inlet control valve 1000, when the water volume detection device detects that the flexible water bag 800 is going to be filled up with the pure water, such that the water purification system 1 stops water purification.

Figure 1:
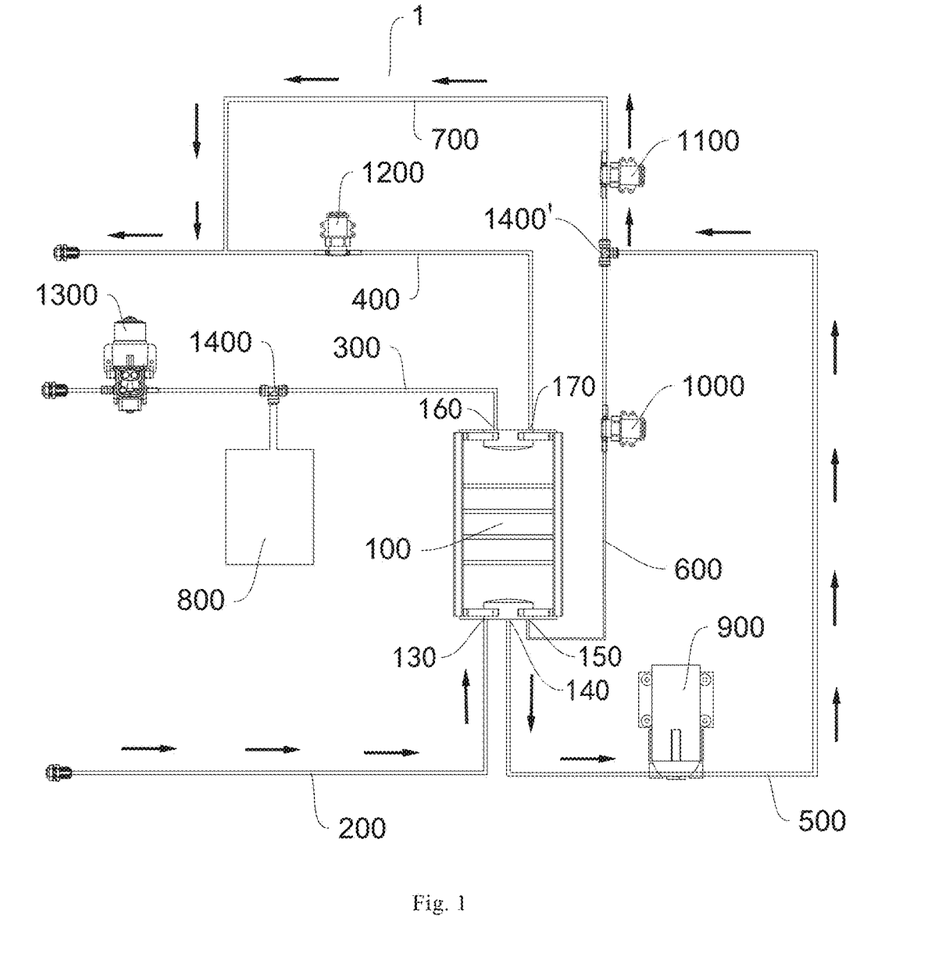
FIG. 1 is a schematic view of a water purification system in a state of rinsing drain according to an embodiment of the present invention.

As shown in FIG. 1, when the water purification system 1 needs to be cleaned and rinsed, the control device opens the rinsing drain control valve 1100 and closes the water inlet control valve 1000, the booster pump 900 and the wastewater proportion control valve 1200, such that the raw water is discharged from the rinsing drain pipe 700 and the condensed water outlet pipe 400 (the water flow direction is shown as an arrow in FIG. 1) after the raw water inlet pipe 200, the composite filter cartridge 100 and the pretreatment water outlet pipe 500 are sequentially rinsed by the raw water. At that time, the water can be utilized to rinse the pretreatment portion in the composite filter cartridge 100 for 2 minutes, so as to guarantee cleanness and hygiene of the composite filter cartridge 100.

In the water purification system 1 according to the embodiments of the present invention, the pretreatment filter cartridge 110 and the filtration membrane assembly 120 are integrated to replace the multistage filter cartridge in the current water purification system, so as to simplify the pipeline connection, to facilitate installation and replacement, to reduce the number of joints and hence that of leakage risk points. Moreover, since the composite filter cartridge 100 integrates the pretreatment filter cartridge 110 and the filtration membrane assembly 120, the service life of both can be equal, which eliminates inconvenience of frequent changes of the filter cartridge, and thus lowers the cost of use considerably.

Furthermore, the flexible water bag 800 is disposed in the water purification system 1, such that the flexible water bag 800 replaces a pressure tank disposed externally in the prior art to store the pure water after purification, so as to reduce the space occupied by the water purification system 1, to avoid secondary pollution of pure water due to potential residual water, and to guarantee health of drinking water.

In addition, the control device is further disposed to control the switch of the water purification system 1 between the rinsing function and the purification function, and to control whether to open or close the water purification system 1 according to the water volume in the flexible water bag 800. For example, the water purification system 1 is started to purify water when the pure water in the flexible water bag 800 becomes less, and the pure water after purification is stored in the flexible water bag 800. The water purification system 1 is closed to stop purifying water when the pure water in the flexible water bag 800 is enough, so as to avoid material loss due to long operating time of the water purification system 1.

Consequently, the water purification system 1 according to the embodiments of the present invention has the advantages of simple pipeline connection, convenient installation and replacement, few leakage risk points, good user experience, low cost of use, occupation of little space, low possibility of secondary pollution of pure water, energy conservation and environment protection.

In the following, the water purification system 1 according to specific embodiments of the present invention will be illustrated with reference to drawings.

In some specific embodiments of the present invention, as shown in FIG. 1 to FIG. 4, the water purification system 1 according to the embodiments of the present invention includes the composite filter cartridge 100, the raw water inlet pipe 200, the pure water outlet pipe 300, the condensed water outlet pipe 400, the pretreatment water outlet pipe 500, the pressurizing pretreatment water inlet pipe 600, the rinsing drain pipe 700, the flexible water bag 800, the booster pump 900, the water inlet control valve 1000, the rinsing drain control valve 1100, the wastewater proportion control valve 1200 and a control device.

The water purification system 1 can further include a water pump 1300 disposed on the pure water outlet pipe 300, and the flexible water bag 800 is located between the water pump 1300 and the composite filter cartridge 100. When the user needs water, the pure water in the flexible water bag 800 can be pumped out by the water pump 1300, so as to facilitate extraction of the pure water stored in the flexible water bag 800 for the convenience of the user, and to further facilitate discharge of the pure water in the flexible water bag 800 to prevent the pure water from remaining in the flexible water bag 800, which causes secondary pollution.

Optionally, the flexible water bag 800 may be a composite of polyamide (PA) and polyethylene (PE), which can not only avoid pollution of pure water by the flexible water bag 800, but also make it hard to breed bacteria, so as to prevent secondary pollution of the pure water.

Advantageously, an antibacterial agent can be added to the production material of the flexible water bag 800, so as to inhibit bacteria breeding and to avoid secondary pollution of the pure water.

FIG. 1 and FIG. 2 show the water purification system 1 according to a specific example. As shown in FIG. 1 and FIG. 2, the flexible water bag 800 can be connected with the pure water outlet pipe 300 via a first three-way pipe 1400, so as to realize communication between the pure water outlet pipe 300 and the flexible water bag 800, and to guarantee tightness of connection between the flexible water bag 800 and the pure water outlet pipe 300.

Specifically, each of the water inlet control valve 1000, the rinsing drain control valve 1100 and the wastewater proportion control valve 1200 can be an electromagnetic valve, so as to realize on-off control of the pressurizing pretreatment water inlet pipe 600, the rinsing drain pipe 700 and the condensed water outlet pipe 400 by the electromagnetic valves respectively.

Optionally, as shown in FIG. 1 and FIG. 2, the pretreatment water outlet pipe 500, the pressurizing pretreatment water inlet pipe 600 and the rinsing drain pipe 700 can be connected to each other via a second three-way pipe 1400, so as to realize the communication among the pretreatment water outlet pipe 500, the pressurizing pretreatment water inlet pipe 600 and the rinsing drain pipe 700, and to guarantee tightness of communication.

Figure 3:
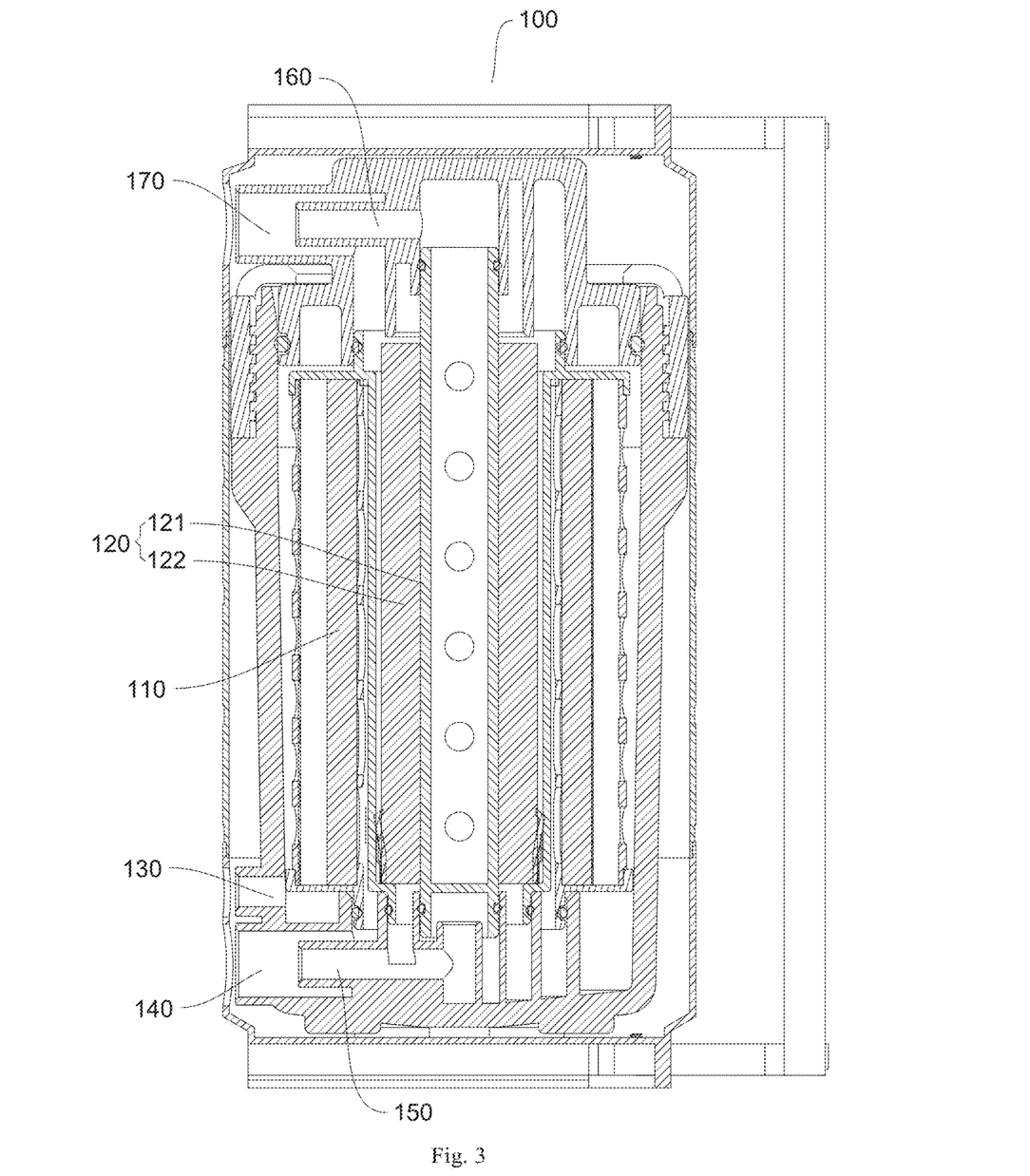
FIG. 3 is a sectional view of a composite filter cartridge of a water purification system according to an embodiment of the present invention.
Figure 4:
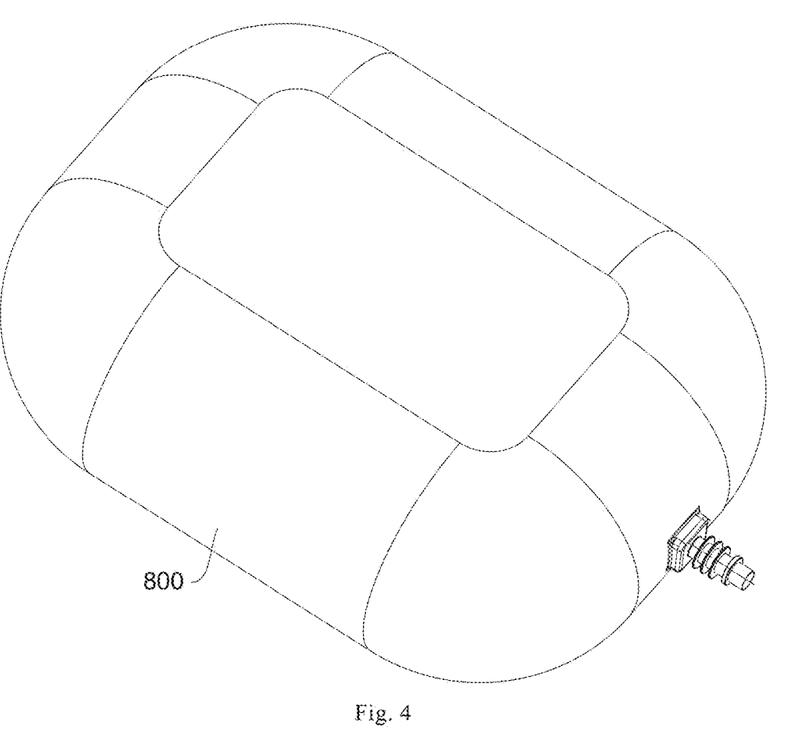
FIG. 4 is a schematic view of a flexible water bag of a water purification system according to an embodiment of the present invention.

In a specific embodiment of the present invention, as shown in FIG. 3, the pretreatment filter cartridge 110 includes a PP non-woven fabric winding outer layer and an activated carbon (CB) inner layer.

Optionally, the pretreatment filter cartridge 110 also can include a PP outer layer, an activated carbon middle layer, and an ultrafiltration (UF) inner layer or a PP inner layer, in which the activated carbon inner layer or the activated carbon middle layer can be an activated carbon rod or be formed by winding an activated carbon fiber.

For example, the pretreatment filter cartridge 110 can include a PP cotton outer layer of 5 μm, an activated carbon rod as the middle layer, and a PP cotton inner layer of 1 μm; or the pretreatment filter cartridge 110 also can include a winding PP outer layer, an activated carbon rod as the middle layer, and an ultrafiltration inner layer; or the pretreatment filter cartridge 110 can be formed with a PP cotton outer layer, an activated carbon rod as the middle layer and an ultrafiltration inner layer.

As shown in FIG. 3, the filtration membrane assembly 120 can include a central water collecting pipe 121 and a filtration membrane 122 winded around the central water collecting pipe 121. The filtration membrane 122 can be a reserve osmosis membrane, an ultrafiltration membrane or a nanofiltration membrane. The filtration membrane 122 is used to further filter the pretreated water, and to transport the pure water after purification to the pure water outlet 160 via the central water collecting pipe 121, while the condensed water outside the central water collecting pipe 121 is discharged from the composite filter cartridge 100 via the condensed water outlet 170.

Other configurations and operations of the water purification system 1 according to the embodiments of the present invention are known to those skilled in the art, which will not be described in detail.

In the specification, it shall be understood that terms such as "central," "longitudinal," "lateral," "length," "width," "thickness," "upper," "lower," "front," "rear," "left," "right," "vertical," "horizontal," "top," "bottom," "inner," "outer," "clockwise," and "counterclockwise" should be construed to refer to the orientation or position as then described or as shown in the drawings under discussion. These relative terms are for convenience of description and do not indicate or imply that the present invention must have a particular orientation, or be constructed or operated in a particular orientation, and thus shall not be construed to limit the present invention.

In addition, terms such as "first" and "second" are used herein for purposes of description and are not intended to indicate or imply relative importance or significance or to imply the number of indicated technical features. Thus, the feature defined with "first" and "second" may comprise one or more of this feature. In the description of the present invention, "a plurality of" means two or more than two, unless specified otherwise.

In the present invention, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications or interaction of two elements, which can be understood by those skilled in the art according to specific situations.

In the present invention, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. Thus, the appearances of the above phrases throughout this specification are not necessarily referring to the same embodiment or example of the present invention. Furthermore, the particular features, structures, materials, or characteristics may be combined in any suitable manner in one or more embodiments or examples.

Those skilled in the art can integrate and combine different embodiments or examples in the specification.

Although embodiments of the present invention have been shown and described, it would be appreciated by those skilled in the art that the above embodiments are explanatory, and cannot be construed to limit the present invention. Those skilled in the art can make changes, modifications, alternatives and variations in the embodiments without departing from the scope of the present invention.

What is claimed is:

1. A water purification system, comprising:
   a filter housing comprising a composite filter cartridge, wherein
   the composite filter cartridge is provided with a raw water inlet, a pretreatment water outlet, a pressurizing pretreatment water inlet, a pure water outlet and a condensed water outlet, and the composite filter cartridge comprises a pretreatment filter cartridge, wherein the pretreatment filter cartridge is located between the raw water inlet and the pretreatment water outlet, wherein a filtration membrane assembly is embedded in the pretreatment filter cartridge and, the filtration membrane assembly being located between the pressurizing pretreatment water inlet and the pure water outlet and also being located between the pressurizing pretreatment water inlet and the condensed water outlet; and, wherein
   a raw water inlet pipe is connected with the raw water inlet;
   a pure water outlet pipe is connected with the pure water outlet;
   a condensed water outlet pipe is connected with the condensed water outlet;
   a pretreatment water outlet pipe is connected with the pretreatment water outlet; and
   a pressurizing pretreatment water inlet pipe is connected with the pressurizing pretreatment water inlet and the pretreatment water outlet pipe respectively; and
   a booster pump is disposed on the pretreatment water outlet pipe; and, wherein
   wherein the water purification system is configured to:
      receive raw water from the raw water inlet pipe that enters the composite filter cartridge through the raw water inlet and then flows through the pretreatment filter cartridge, thereby producing pretreated water;
      discharge the pretreated water out of the filter housing from the pretreatment water outlet to the pretreatment water outlet pipe and then through the booster pump, thereby producing pressurized water;
      receive the pressurized water from the pressurizing pretreatment water inlet pipe that enters the filter housing through the pressurizing pretreatment water inlet and then flows through the filtration membrane assembly for producing pure water and condensed water;
      discharge the condensed water out of the filter housing from the condensed water outlet to the condensed water outlet pipe; and
      discharge the pure water out of the composite filter cartridge from the pure water outlet to the pure water outlet pipe.

2. The water purification system according to claim 1, further comprising:
   a rinsing drain pipe, having a first end connected with the condensed water outlet pipe, and a second end connected with the pretreatment water outlet pipe and the pressurizing pretreatment water inlet pipe respectively;
   a rinsing drain control valve disposed on the rinsing drain pipe; and
   a water inlet control valve disposed on the pressurizing pretreatment water inlet pipe.

3. The water purification system according to claim 2, further comprising a wastewater proportion control valve disposed on the condensed water outlet pipe and located between the composite filter cartridge and the rinsing drain pipe.

4. The water purification system according to claim 3, further comprising:
   a flexible water bag disposed on the pure water outlet pipe, and comprising a water volume detection device configured to detect the water volume in the flexible water bag; and
   a control device connected with the water volume detection device, the water inlet control valve, the booster pump, the rinsing drain control valve and the wastewater proportion control valve respectively.

5. The water purification system according to claim 4, further comprising:
   a water pump disposed on the pure water outlet pipe, the flexible water bag being located between the water pump and the composite filter cartridge.

6. The water purification system according to claim 4, wherein the flexible water bag is a composite of polyamide and polyethylene.

7. The water purification system according to claim 4, wherein an antibacterial agent is provided within the flexible water bag.

8. The water purification system according to claim 4, wherein the flexible water bag is connected with the pure water outlet pipe via a first three-way pipe.

9. The water purification system according to claim 3, wherein each of the water inlet control valve, the rinsing drain control valve and the wastewater proportion control valve is an electromagnetic valve.

10. The water purification system according to claim 2, wherein the pretreatment water outlet pipe, the pressurizing pretreatment water inlet pipe and the rinsing drain pipe are connected to each other via a second three-way pipe.

11. The water purification system according to claim 1, wherein the pretreatment filter cartridge comprises a polypropylene (PP) non-woven fabric winding outer layer and an activated carbon inner layer; or
   the pretreatment filter cartridge comprises a PP outer layer, an activated carbon middle layer, and an ultrafiltration inner layer or a PP inner layer.

12. The water purification system according to claim 1, wherein the filtration membrane assembly comprises a central water collecting pipe, and a reverse osmosis membrane, an ultrafiltration membrane or a nanofiltration membrane wound around the central water collecting pipe.

* * * * *